(12) United States Patent
Beckhusen et al.

(10) Patent No.: US 12,349,634 B2
(45) Date of Patent: Jul. 8, 2025

(54) STARTER ROLLER AND BLOCKING BAR FOR A CONVEYING SYSTEM OF AN AGRICULTURAL HARVESTER

(71) Applicant: CNH Industrial America LLC, New Holland, PA (US)

(72) Inventors: Jordan Beckhusen, McGregor, TX (US); Niels Dybro, Muscatine, IA (US); Jonathan Shenk, Lititz, PA (US); Trenton Charles Vrchoticky, West Liberty, IA (US); Scott Simmons, Lititz, PA (US); Joseph Marth, Prophetstown, IL (US); Brian Patrick Crow, Andalusia, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 18/805,694

(22) Filed: Aug. 15, 2024

(65) Prior Publication Data

US 2025/0057086 A1     Feb. 20, 2025

Related U.S. Application Data

(60) Provisional application No. 63/520,185, filed on Aug. 17, 2023.

(51) Int. Cl.
  *A01F 15/18*  (2006.01)
  *A01D 61/02*  (2006.01)
  *A01F 15/07*  (2006.01)

(52) U.S. Cl.
  CPC .............. *A01F 15/18* (2013.01); *A01D 61/02* (2013.01); *A01F 15/0705* (2013.01); *A01F 2015/186* (2013.01)

(58) Field of Classification Search
  CPC .................. A01F 15/18; A01F 15/0705; A01F 2015/186; A01D 61/02
  See application file for complete search history.

(56) References Cited

U.S. PATENT DOCUMENTS

| 1,624,703 | A | * | 4/1927 | Witte | ................... | A01D 61/002 |
| | | | | | | 100/151 |
| 3,170,564 | A | * | 2/1965 | Gatto | ................... | B29C 48/355 |
| | | | | | | 198/626.5 |

(Continued)

OTHER PUBLICATIONS

U.S. Appl. No. 63/515,422, filed Jul. 25, 2023, Jordan Beckhusen.

*Primary Examiner* — Arpad Fabian-Kovacs
(74) *Attorney, Agent, or Firm* — Peter K. Zacharias; Rebecca L. Henkel; Rickard K. DeMille

(57) ABSTRACT

A conveying system for an agricultural harvester includes a first belt and a second belt. The first belt and the second belt are configured to transport agricultural product along a downstream direction toward a cavity. The conveying system also includes a starter roller spaced apart from the first belt by a gap along a vertical axis. The starter roller is configured to initiate formation of a bale of the agricultural product within the cavity. Furthermore, the conveying system includes a blocking bar positioned proximate to the first belt and to the starter roller. A vertical extent of the blocking bar at least partially overlaps the gap with respect to the vertical axis, and the blocking bar is configured to block the agricultural product within the cavity from passing through the gap along an upstream direction.

20 Claims, 8 Drawing Sheets

(56) References Cited

U.S. PATENT DOCUMENTS

| | | | | |
|---|---|---|---|---|
| 3,468,409 A * | 9/1969 | Ball | | B66D 3/003 |
| | | | | 198/626.6 |
| 4,686,820 A | 8/1987 | Audra et al. | | |
| 5,255,501 A * | 10/1993 | McWilliams | | A01F 15/07 |
| | | | | 100/88 |
| 5,458,051 A * | 10/1995 | Alden | | B65G 23/44 |
| | | | | 198/813 |
| 6,032,446 A * | 3/2000 | Gola | | A01F 15/00 |
| | | | | 100/88 |
| 7,231,814 B2 | 6/2007 | Platon et al. | | |
| 9,084,394 B2 * | 7/2015 | Roberge | | A01D 91/00 |
| 9,101,089 B2 | 8/2015 | Horstmann | | |
| 9,226,452 B2 | 1/2016 | Biziorek | | |
| 9,253,948 B2 * | 2/2016 | Olander | | A01F 15/106 |
| 10,188,043 B2 | 1/2019 | Olander et al. | | |
| 10,375,889 B2 * | 8/2019 | Figger | | A01D 34/64 |
| 11,252,873 B2 | 2/2022 | Zhao et al. | | |
| 2005/0086921 A1 * | 4/2005 | Bares | | A01D 46/08 |
| | | | | 56/28 |
| 2007/0251203 A1 * | 11/2007 | Coers | | A01D 61/02 |
| | | | | 56/181 |
| 2008/0271428 A1 * | 11/2008 | Rempe | | A01F 15/106 |
| | | | | 56/341 |
| 2010/0192513 A1 * | 8/2010 | Wigdahl | | A01D 46/084 |
| | | | | 53/529 |
| 2011/0067374 A1 * | 3/2011 | James | | A01F 15/0715 |
| | | | | 492/30 |
| 2012/0204734 A1 * | 8/2012 | Reijersen Van Buuren | | |
| | | | | A01F 15/0705 |
| | | | | 100/88 |
| 2013/0036921 A1 * | 2/2013 | Horstmann | | A01F 15/0705 |
| | | | | 100/40 |
| 2013/0313077 A1 * | 11/2013 | Boyd | | B65G 19/12 |
| | | | | 198/832 |
| 2014/0144119 A1 * | 5/2014 | Olander | | A01F 15/0705 |
| | | | | 56/341 |
| 2016/0120126 A1 * | 5/2016 | Weber | | A01D 46/084 |
| | | | | 56/16.4 B |
| 2016/0353664 A1 * | 12/2016 | Weber | | A01F 15/18 |
| 2017/0112060 A1 * | 4/2017 | Noonan | | A01D 69/02 |
| 2020/0260645 A1 | 8/2020 | Seimetz et al. | | |
| 2021/0068348 A1 * | 3/2021 | Wigdahl | | A01F 15/0841 |
| 2021/0185934 A1 | 6/2021 | Weller et al. | | |
| 2021/0282318 A1 | 9/2021 | Cracraft | | |

\* cited by examiner

STARTER ROLLER AND BLOCKING BAR FOR A CONVEYING SYSTEM OF AN AGRICULTURAL HARVESTER

CROSS-REFERENCE TO RELATED APPLICATION

This application claims priority from and the benefit of U.S. Provisional Application Ser. No. 63/520,185, entitled "MAT LEVELING SYSTEM FOR A CONVEYING SYSTEM OF AN AGRICULTURAL HARVESTER", filed Aug. 17, 2023, which is hereby incorporated by reference in its entirety.

BACKGROUND

The present disclosure relates generally to a mat leveling system for a conveying system of an agricultural harvester.

Agricultural harvesters are used to harvest agricultural products (e.g., cotton or other natural material(s)). For example, an agricultural harvester may include a header having drums configured to harvest the agricultural product from a field. The agricultural harvester may also include an air-assisted conveying system configured to move the agricultural product from the drums to an accumulator. The agricultural product may then be fed into a baler via a conveying system. The baler may compress the agricultural product into a package to facilitate storage, transport, and handling of the agricultural product. For example, a round baler may compress the agricultural product into a round bale within a baling chamber, such that the round bale has a desired size and density. After forming the bale, the bale may be wrapped with a bale wrap to secure the agricultural product within the bale and to generally maintain the shape of the bale.

BRIEF DESCRIPTION

In certain embodiments, a mat leveling system for a conveying system of an agricultural harvester includes a first outlet roller configured to support a first belt of a pair of opposing belts. The first outlet roller is configured to be positioned at an outlet of the pair of opposing belts. The mat leveling system also includes a second outlet roller configured to support a second belt of the pair of opposing belts. The second outlet roller is configured to be positioned at the outlet of the pair of opposing belts. Furthermore, the mat leveling system includes a first mounting assembly configured to enable movement of the first outlet roller relative to the second outlet roller and to urge the first outlet roller toward the second belt to reduce variations in a thickness of a mat of agricultural product, a second mounting assembly configured to enable movement of the second outlet roller relative to the first outlet roller and to urge the second outlet roller toward the first belt to reduce the variations in the thickness of the mat of the agricultural product, or a combination thereof.

Furthermore, in certain embodiments, a conveying system for an agricultural harvester includes a first belt and a second belt spaced apart from the first belt with respect to a vertical axis of the agricultural harvester. The first belt and the second belt are configured to transport agricultural product along a downstream direction toward a cavity. The conveying system also includes a starter roller spaced apart from the first belt by a gap along the vertical axis. The starter roller is configured to initiate formation of a bale of the agricultural product within the cavity. Furthermore, the conveying system includes a blocking bar positioned proximate to the first belt and to the starter roller. A vertical extent of the blocking bar at least partially overlaps the gap with respect to the vertical axis, and the blocking bar is configured to block the agricultural product within the cavity from passing through the gap along an upstream direction.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
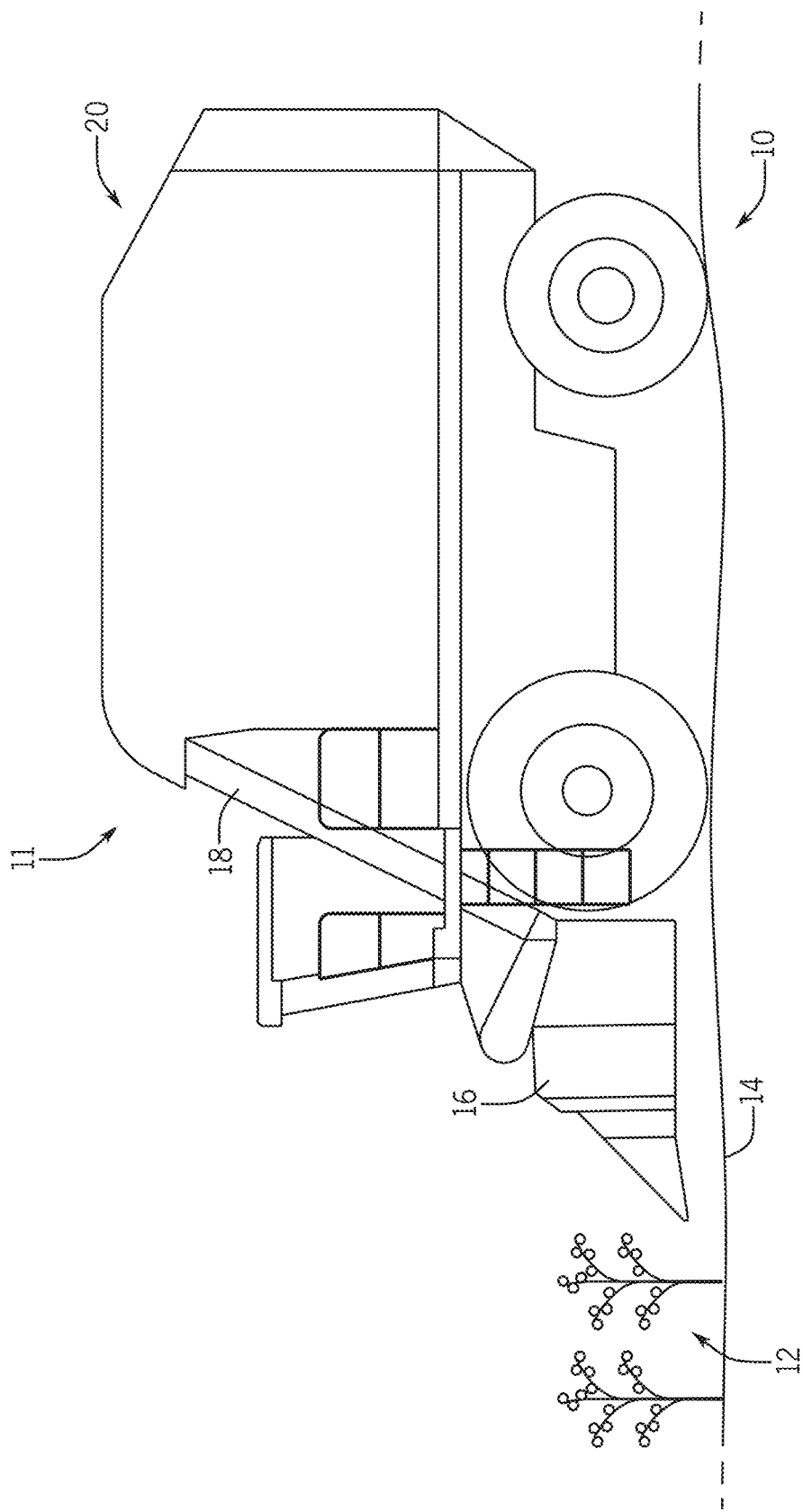
FIG. 1 is a side view of an embodiment of an agricultural machine system having an agricultural product transport assembly.

FIG. 1 is a side view of an embodiment of an agricultural machine system 10 (e.g., harvester, agricultural harvester) having an agricultural product transport assembly 11. The agricultural machine system 10 is configured to harvest agricultural product 12 (e.g., cotton) from a field 14 and to form the agricultural product 12 into bales (e.g., agricultural bales). In the illustrated embodiment, the agricultural machine system 10 includes a header 16 having drums configured to harvest the agricultural product 12 from the field 14. Additionally, the agricultural product transport assembly 11 of the agricultural machine system 10 includes an air-assisted conveying system 18 configured to move the agricultural product 12 from the drums of the header 16 to an accumulator of the agricultural product transport assembly 11. The agricultural product transport assembly 11 also includes a conveying system configured to convey the agricultural product 12 from the accumulator into a baler 20 (e.g., agricultural baler). The baler 20 is supported by and/or mounted within or on a chassis of the agricultural machine system 10. The baler 20 may form the agricultural product 12 into round bales. However, in other embodiments, the baler 20 of the agricultural machine system 10 may form the agricultural product into square bales, polygonal bales, or bales of other suitable shape(s). After forming the agricultural product 12 into a bale, a bale wrapping system of the agricultural machine system 10 wraps the bale with a bale wrap to secure the agricultural product 12 within the bale and to generally maintain a shape of the bale.

As discussed in detail below, the conveying system includes a pair of opposing belts configured to compress the agricultural product 12 and to transport the agricultural product 12 from the accumulator to the baler 20. Furthermore, in certain embodiments, the conveying system includes a mat leveling system configured to reduce variations in a thickness of a mat of the agricultural product formed by the pair of opposing belts. In certain embodiments, the mat leveling system includes a first outlet roller configured to support a first belt of the pair of opposing belts. The first outlet roller is positioned at an outlet of the pair of opposing belts. The mat leveling system also includes a second outlet roller configured to support a second belt of the pair of opposing belts. The second outlet roller is positioned at the outlet of the pair of opposing belts. In addition, the mat leveling system includes a first mounting assembly and/or a second mounting assembly. The first mounting assembly is configured to enable movement of the first outlet roller relative to the second outlet roller and to urge the first outlet roller toward the second belt to reduce the variations in the thickness of the mat of the agricultural product. Furthermore, the second mounting assembly is configured to enable movement of the second outlet roller relative to the first outlet roller and to urge the second outlet roller toward the first belt to reduce the variations in the thickness of the mat of the agricultural product. Reducing the variations in the thickness of the mat enhances the uniformity of the agricultural product entering the baler. As a result, density variations within the resultant bale may be reduced, thereby enhancing downstream logistics and processing of the agricultural product.

Furthermore, in certain embodiments, the conveying system includes a starter roller spaced apart from the first belt by a gap along a vertical axis of the agricultural machine system 10. The starter roller is configured to initiate formation of the bale of the agricultural product within a cavity of the baler 20, and the pair of opposing belts is configured to transport the agricultural product in a downstream direction from the accumulator to the cavity of the baler 20. Furthermore, the conveying system includes a blocking bar positioned proximate to the first belt and to the starter roller. A vertical extent of the blocking bar at least partially overlaps the gap with respect to the vertical axis, and the blocking bar is configured to block the agricultural product within the cavity from passing through the gap along an upstream direction. As a result, the amount of agricultural product that engages a top surface of the first belt and is moved toward the accumulator may be substantially reduced, thereby substantially reducing accumulation of the agricultural product within and/or on certain components of the agricultural machine system 10 (e.g., components that are not configured to interact with the agricultural product).

Figure 2:
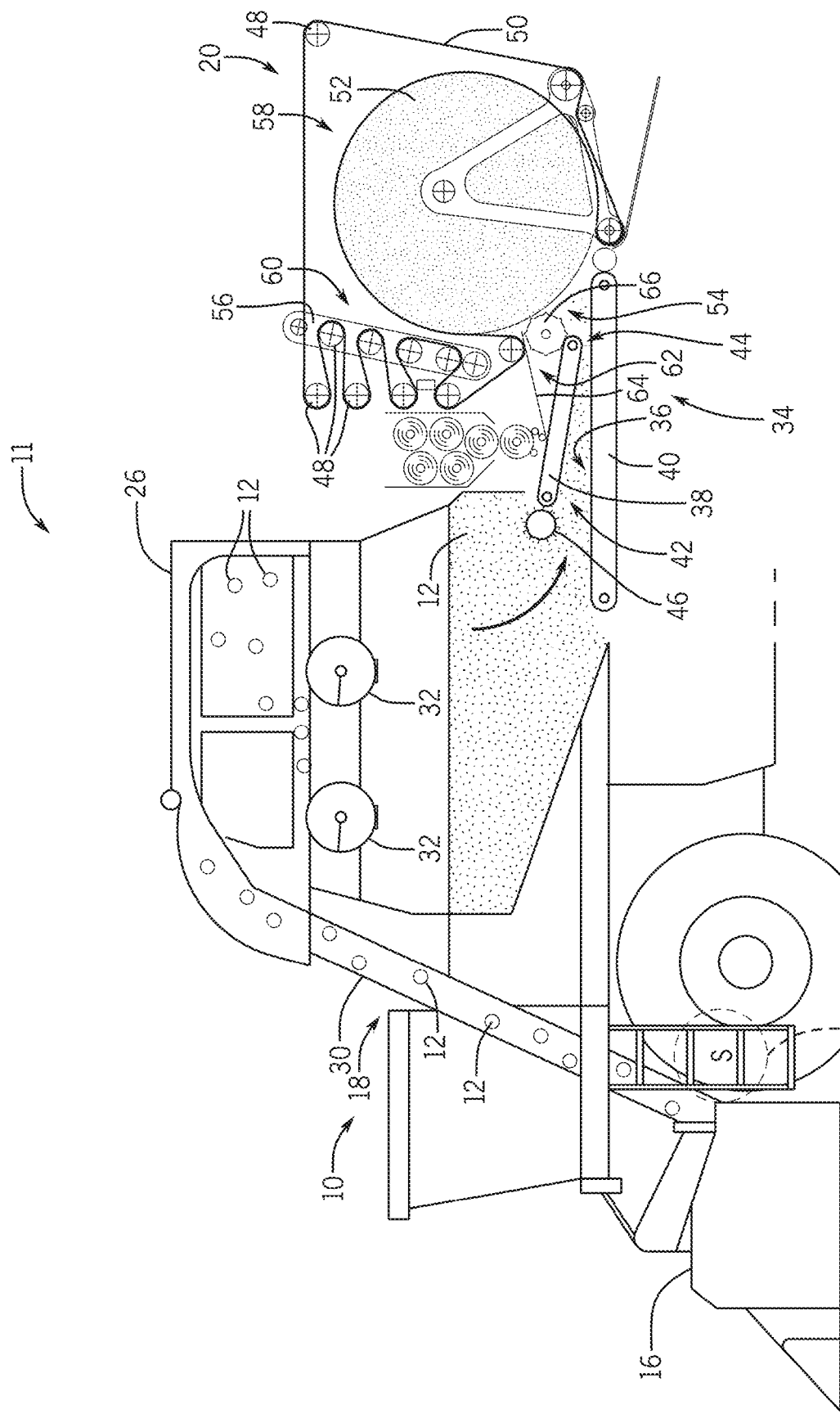
FIG. 2 is a schematic view of an embodiment of an agricultural product transport assembly that may be employed within the agricultural machine system of FIG. 1.

FIG. 2 is a schematic view of an embodiment of an agricultural product transport assembly 11 that may be employed within the agricultural machine system of FIG. 1. As previously discussed, the header 16 of the agricultural machine system 10 includes drums configured to harvest the agricultural product 12 (e.g., cotton) from the field. Furthermore, the air-assisted conveying system 18 is configured to move the agricultural product 12 from the drums of the header 16 to the accumulator 26. In the illustrated embodiment, the air-assisted conveying system 18 includes a conveying air source 28 configured to output a conveying air flow through one or more ducts 30. Each duct 30 receives the agricultural product 12 (e.g., cotton) from the header 16, and the conveying air flow output by the conveying air source 28 drives the agricultural product to move through the duct(s) 30 from the header 16 to the accumulator 26. In the illustrated embodiment, the agricultural product transport assembly 11 includes augers 32 configured to distribute the agricultural product 12 (e.g., cotton) laterally across the accumulator 26 (e.g., crosswise to the direction of movement of the agricultural product through the accumulator). In the illustrated embodiment, the agricultural product transport assembly 11 includes two augers 32. However, in other embodiments, the agricultural product transport assembly may include more or fewer augers (e.g., 0, 1, 3, 4, or more).

In the illustrated embodiment, the conveying system 34 of the agricultural product transport assembly 11 includes a pair of opposing belts 36 configured to compress the agricultural product 12 and to transport the agricultural product 12 from the accumulator 26 to the baler 20. As illustrated, the pair of opposing belts 36 includes a first belt (e.g., top belt) 38 and a second belt (e.g., bottom belt) 40, in which the belts are positioned on opposite sides of the agricultural product 12. The agricultural product 12 enters the pair of opposing belts 36 at an inlet 42, and the agricultural product 12 exits the pair of opposing belts 36 at an outlet 44. Furthermore, in the illustrated embodiment, the conveying system 34 includes an agitation roller 46 positioned upstream of the inlet 42 of the pair of opposing belts 36. The agitation roller 46 is configured to agitate the agricultural product 12 entering the pair of opposing belts 36, thereby enhancing the uniformity of the distribution of the agricultural product passing through the pair of opposing belts 36.

In the illustrated embodiment, the baler 20 includes multiple rollers 48 that support and/or drive rotation of one or more belts 50. For example, one or more rollers 48 engage the belt(s) 50, which enable the belt(s) 50 to move along the pathway defined by the rollers 48 and the bale 52. One or more rollers 48 are driven to rotate via a belt drive system (e.g., including electric motor(s), hydraulic motor(s), pneumatic motor(s), etc.). The belt(s) 50 circulate around the pathway defined by the rollers 48 and the bale 52. Movement of the belt(s) 50 captures agricultural product 12 from the conveying system 34 and draws the agricultural product 12 into a cavity 54, where the agricultural product 12 is gradually built up to form the bale 52.

In the illustrated embodiment, the baler 20 includes a tension arm 56 configured to establish tension within the belt(s) 50. As the agricultural product 12 builds within the cavity 54, the agricultural product 12 applies a force to the belt(s) 50 that urges a first portion 58 of the belt(s) 50 surrounding the bale 52 to expand. Concurrently, the size of a second portion 60 (e.g., serpentine portion) of the belt(s) 50 is reduced. Accordingly, the second portion 60 of the belt(s) 50 provides the increasing belt length for the expanding first portion 58. In the illustrated embodiment, the second portion 60 of the belt(s) 50 is established by fixed rollers 48 (e.g., rollers fixed to a housing/frame of the baler 20) and rollers 48 coupled to the tension arm 56, which is pivotable relative to the fixed rollers 48 (e.g., relative to the housing/frame of the baler 20). Accordingly, as the agricultural product 12 builds within the cavity 54, the tension arm 56 is driven to rotate, thereby reducing the size of the second portion 60 and enabling the first portion 58 to expand.

Once the bale 52 reaches a desired size, a bale wrapping system 62 wraps the bale 52 with a bale wrap 64 to secure the agricultural product within the bale 52 and to generally maintain a shape of the bale 52, such as the round shape in the illustrated embodiment. In other embodiments, the shape of the bale may be rectangular, polygonal, or another suitable shape. The bale wrap 64 may be fed into contact with the bale 52 using one or more feed rollers. The feed rollers drive the bale wrap 64 toward a starter roller 66. The starter roller 66 is configured to rotate to initiate formation of the bale 52 within the cavity 54 and to drive the bale wrap 64 into contact with the bale 52. The bale wrap 64 is captured between the bale 52 and the belt(s) 50. Accordingly, rotation of the bale 52 draws the bale wrap 64 around the bale 52, thereby wrapping the bale 52. After the bale 52 is wrapped, the bale 52 is ejected from the baler 20, and the process of forming a subsequent bale may be initiated.

In certain embodiments, during the harvesting process, the conveying system 34 and the baler 20 may be periodically activated to transfer the agricultural product 12 from the accumulator 26 to the baler 20 and to form the bale 52. For example, as the agricultural machine system 10 traverses a field, the agricultural product 12 may accumulate within the accumulator 26. After a selected accumulator high fill level is reached, the conveying system 34 may be activated to transfer the agricultural product 12 from the accumulator 26 to the baler 20. For example, the conveying system 34 may transport the agricultural product 12 toward the baler 20 at a significantly faster rate than the air-assisted conveying system 18 moves the agricultural product 12 into the accumulator 26. Concurrently with activation of the conveying system 34, the baler 20 may be activated to initiate the bale forming process, as described above. After an accumulator low fill level is reached, the conveying system 34 and the baler 20 may be deactivated to enable the accumulator 26 to collect additional agricultural product 12. In certain embodiments, the conveying assembly 34 and the baler 20 may be activated four or five times to enable the bale 52 to reach the desired size. As previously discussed, once the bale reaches the desired size, the bale wrapping system 62 wraps the bale 52 with the bale wrap 64. Because the conveying system 34 and the baler 20 are periodically activated, the agricultural machine system 10 may utilize less energy during the harvesting process (e.g., as compared to continuously operating the conveying system and the baler).

In certain embodiments, the conveying system 34 includes a mat leveling system configured to reduce variations in a thickness of a mat of the agricultural product formed by the pair of opposing belts. For example, in certain embodiments, the mat leveling system includes a first outlet roller configured to support the first belt 38 of the pair of opposing belts 36. The first outlet roller is positioned at the outlet 44 of the pair of opposing belts 36. The mat leveling system also includes a second outlet roller configured to support the second belt 40 of the pair of opposing belts 36. The second outlet roller is positioned at the outlet 44 of the pair of opposing belts 36. In addition, the mat leveling system includes a first mounting assembly and/or a second mounting assembly. The first mounting assembly is configured to enable movement of the first outlet roller relative to the second outlet roller and to urge the first outlet roller toward the second belt 40 to reduce the variations in the thickness of the mat of the agricultural product. Furthermore, the second mounting assembly is configured to enable movement of the second outlet roller relative to the first outlet roller and to urge the second outlet roller toward the first belt 38 to reduce the variations in the thickness of the mat of the agricultural product. Reducing the variations in the thickness of the mat enhances the uniformity of the agricultural product entering the baler. As a result, density variations within the resultant bale may be reduced, thereby enhancing downstream logistics and processing of the agricultural product.

The starter roller 66 is spaced apart from the first belt 38 by a gap along a vertical axis of the agricultural machine system 10. The starter roller 66 is configured to initiate formation of the bale 52 of the agricultural product 12 within the cavity 54 of the baler 20, and the pair of opposing belts 36 is configured to transport the agricultural product 12 in a downstream direction from the accumulator 26 to the cavity 54 of the baler 20. In certain embodiments, the conveying system 34 includes a blocking bar positioned proximate to the first belt 38 and to the starter roller 66. A vertical extent of the blocking bar at least partially overlaps the gap with respect to the vertical axis, and the blocking bar is configured to block the agricultural product 12 within the cavity 54 from passing through the gap along an upstream direction. As a result, the amount of agricultural product 12 that engages a top surface of the first belt 38 and is moved toward the accumulator 26 may be substantially reduced, thereby substantially reducing accumulation of the agricultural product 12 within and/or on certain components of the agricultural machine system 10 (e.g., components that are not configured to interact with the agricultural product 12).

Figure 3:
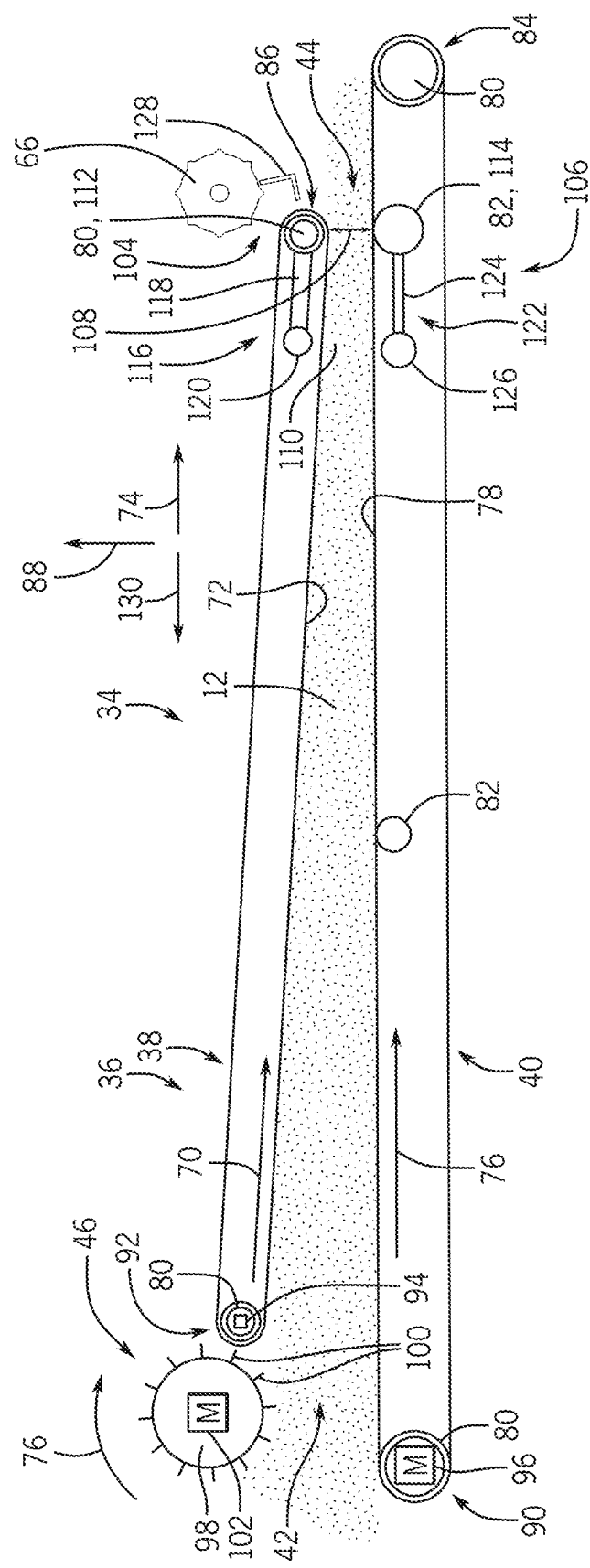
FIG. 3 is a schematic view of an embodiment of a conveying system that may be employed within the agricultural product transport assembly of FIG. 2.

FIG. 3 is a schematic view of an embodiment of a conveying system 34 that may be employed within the agricultural product transport assembly of FIG. 2. As previously discussed, the pair of opposing belts 36 is configured to compress the agricultural product 12 and to transport the agricultural product from the accumulator to the baler. The first belt 38 is configured to rotate in a first rotational direction 70 to move an agricultural product engaging surface 72 of the first belt 38 toward the baler along a translational direction (e.g., downstream direction) 74. Furthermore, the second belt 40 is positioned on an opposite side of the agricultural product 12 from the first belt 38, and the second belt 40 is configured to rotate in a second rotational direction 76, opposite the first rotational direction 70, to move an agricultural product engaging surface 78 of the second belt 40 toward the baler with respect to the translational direction. Accordingly, the first belt 38 and the second belt 40 are configured to cooperate to move the agricultural product 12 from the accumulator to the baler along the translational direction (e.g., downstream direction) 74. In the illustrated embodiment, the first belt 38 and the second belt 40 (e.g., the agricultural product engaging surface 72 of the first belt 38 and the agricultural product engaging surface 78 of the second belt 40) converge along the translational direction 74 toward the baler, thereby compressing the agricultural product 12 between the agricultural product engaging surfaces of the belts.

In the illustrated embodiment, each belt extends along an entire lateral extent of the conveying system (e.g., extent of the conveying system crosswise to the translational direction). However, in other embodiments, the conveying system may include multiple first belts distributed along the lateral extent of the conveying system, and/or the conveying system may include multiple second belts distributed along the lateral extent of the conveying system. Furthermore, in the illustrated embodiment, each belt is rotatably supported by two primary rollers 80, in which each primary roller 80 engages a first inner surface (e.g., top inner surface) and a second inner surface (e.g., bottom inner surface) of the respective belt. The primary rollers 80 are positioned at opposite ends of each belt with respect to the translational direction 74, and the primary rollers 80 extend along the entire lateral extent of the conveying system. In other embodiments, at least one belt may be supported by one or more additional primary rollers. For example, at least one belt may be supported by at least one additional primary roller positioned along the length of the belt with respect to the translational direction, and/or at least one belt may be supported by at least one additional primary roller positioned along a lateral extent of the belt (e.g., multiple primary rollers may be distributed along the lateral extent of the belt at a common position along the length of the belt with respect to the translational direction). In addition, in the illustrated embodiment, the second belt 40 is supported by two secondary rollers 82, in which each secondary roller 82 only contacts one inner surface of the second belt 40. In the illustrated embodiment, each secondary roller 82 contacts the first inner surface (e.g., top inner surface) of the second belt 40. However, in other embodiments, at least one secondary roller may contact the second inner surface (e.g., bottom inner surface) of the second belt. Furthermore, while the second belt 40 is supported by two secondary rollers 82 in the illustrated embodiment, in other embodiments, the second belt may be supported by more or fewer secondary rollers (e.g., 0, 1, 3, 4, or more). For example, in certain embodiments, the second belt may not be supported by any secondary rollers. In addition, in certain embodiments, the first belt may be supported by one or more secondary rollers, in which each secondary roller only contacts one inner surface (e.g., the first inner surface or the second inner surface) of the first belt. In certain embodiments, at least one belt may be supported by a pan extending along a portion of the length of the belt (e.g., in embodiments in which the belt is not supported by any secondary rollers).

While the belts converge along the translational direction 74 toward the baler in the illustrated embodiment, in other embodiments, the belts (e.g., the agricultural product engaging surfaces of the belts) may diverge or be parallel to one another along the translational direction toward the baler. Furthermore, while the conveying system 34 includes opposing belts positioned on opposite sides of the agricultural product 12 in the illustrated embodiment, in other embodiments, the conveying system may only include belt(s) positioned on one side of the agricultural product. For example, in certain embodiments, the conveying system may include belt(s) positioned on one side of the agricultural product and a bearing surface positioned on the opposite side of the agricultural product.

In the illustrated embodiment, the length of the second belt 40 with respect to the translational direction 74 is greater than the length of the first belt 38 with respect to the translational direction 74. As illustrated, a downstream end 84 of the second belt 40 extends beyond a downstream end 86 of the first belt 38 with respect to the translational direction 74. While the downstream end 84 of the second belt 40 extends beyond the downstream end 86 of the first belt 38 with respect to the translational direction 74 in the illustrated embodiment, in other embodiments, the downstream end of the first belt may extend beyond the downstream end of the second belt with respect to the translational direction, or the downstream ends of the belts may be located at the same position with respect to the translational direction. Furthermore, in the illustrated embodiment, an upstream end 90 of the second belt 40 is positioned upstream of an upstream end 92 of the first belt 38 with respect to the translational direction 74. As illustrated, the agitation roller 46 is positioned proximate to the upstream end 92 of the first belt 38, and the agitation roller 46 is positioned on the opposite side of the agricultural product 12 from the second belt 40. While the upstream end 90 of the second belt 40 is positioned upstream of the upstream end 92 of the first belt 38 with respect to the translational direction 74 in the illustrated embodiment, in other embodiments, the upstream end of the first belt may be positioned upstream of the upstream end of the second belt with respect to the translational direction, or the upstream ends of the belts may be located at the same position with respect to the translational direction. Furthermore, in certain embodiments, the length of the first belt may be equal to or greater than the length of the second belt. While the first belt 38 and the agitation roller 46 are positioned above the agricultural product 12 in the conveying system 34 and the second belt 40 is positioned below the agricultural product 12 in the conveying system 34 in the illustrated embodiment, in other embodiments, the first belt and the agitation roller may be positioned below the agricultural product, and the second belt may be positioned above the agricultural product. In addition, the inlet 42 of the pair of opposing belts 36 is positioned at the upstream end 92 of the first belt 38, and the outlet 44 of the pair of opposing belts 36 is positioned at the downstream end 86 of the first belt 38. However, in embodiments in which at least one belt has a different length, the inlet may be positioned at the upstream end of the belt having the farther-downstream upstream end, and the outlet may be positioned at the downstream end of the belt having the farther-upstream downstream end.

In the illustrated embodiment, the first belt 38 is driven to rotate by a motor 94 coupled to one primary roller 80 (e.g., the upstream primary roller 80 or the downstream primary roller 80). The motor 94 may include an electric motor, a pneumatic motor, a hydraulic motor, other suitable type(s) of motor(s), or a combination thereof. While the first belt 38 is driven to rotate by one motor 94 coupled to one primary roller 80 in the illustrated embodiment, in other embodiments, the first belt may be driven to rotate by multiple motors coupled to one or more primary rollers. Furthermore, in certain embodiments, the first belt may be driven to rotate by one or more motors coupled to one or more secondary rollers (e.g., alone or in combination with the motor(s) coupled to the primary roller(s)). In addition, in the illustrated embodiment, the second belt 40 is driven to rotate by a motor 96 coupled to one primary roller 80 (e.g., the upstream primary roller 80 or the downstream primary roller 80). The motor 96 may include an electric motor, a pneumatic motor, a hydraulic motor, other suitable type(s) of motor(s), or a combination thereof. While the second belt 40 is driven to rotate by one motor 96 coupled to one primary roller 80 in the illustrated embodiment, in other embodiments, the second belt may be driven to rotate by multiple motors coupled to one or more primary rollers. Furthermore, in certain embodiments, the second belt may be driven to rotate by one or more motors coupled to one or more secondary rollers (e.g., alone or in combination with the motor(s) coupled to the primary roller(s)). In certain embodiments, the first belt and the second belt may be driven to rotate by a common motor (e.g., a roller supporting one belt may be directly driven by the motor and a roller supporting the other belt may be driven by a belt or chain connection to the motor, a roller supporting each belt may be driven by a belt or chain connection to a gearbox driven by the motor, etc.).

In the illustrated embodiment, the agitation roller 46 is positioned upstream of the inlet 42 of the pair of opposing belts 36. The agitation roller 46 is configured to agitate the agricultural product 12 entering the pair of opposing belts 36, thereby enhancing the uniformity of the distribution of the agricultural product passing through the pair of opposing belts 36. In certain embodiments, the agitation roller 46 is configured to rotate in the second rotational direction 76. However, in other embodiments, the agitation roller may be configured to rotate in the first rotational direction. In the illustrated embodiment, the agitation roller 46 includes a roller 98 and multiple tines 100 extending outwardly from the roller 98. The tines 100 are configured to engage the agricultural product 12 as the agitation roller 46 rotates, thereby agitating the agricultural product 12. In the illustrated embodiment, the agitation roller 46 extends along the entire lateral extent of the conveying system (e.g., extent of the conveying system crosswise to the translational direction 74). However, in other embodiments, the conveying system may include multiple agitation rollers distributed along the lateral extent of the conveying system. Additionally or alternatively, the conveying system may include multiple agitation rollers distributed along the translational direction. Furthermore, while the conveying system 34 includes the agitation roller 46 in the illustrated embodiment, in other embodiments, the agitation roller may be omitted.

In the illustrated embodiment, the agitation roller 46 is driven to rotate by a motor 102 coupled to the roller 98. The motor 102 may include an electric motor, a pneumatic motor, a hydraulic motor, other suitable type(s) of motor(s), or a combination thereof. While the agitation roller 46 is driven to rotate by one motor 102 in the illustrated embodiment, in other embodiments, the agitation roller may be driven to rotate by multiple motors.

The conveying system 34 includes a mat leveling system 106 configured to reduce variations in a thickness 108 of a mat 110 of the agricultural product 12 formed by the pair of opposing belts 36. In the illustrated embodiment, the mat leveling system 106 includes a first outlet roller 112, which corresponds to the downstream primary roller 80 configured to support the first belt 38. As illustrated, the first outlet roller 112 is positioned at the outlet 44 of the pair of opposing belts 36. Furthermore, in the illustrated embodiment, the mat leveling system 106 includes a second outlet roller 114, which corresponds to the downstream secondary roller 82 configured to support the second belt 40. As illustrated, the second outlet roller 114 is positioned at the outlet 44 of the pair of opposing belts 36.

Furthermore, in the illustrated embodiment, the mat leveling system 106 includes a first mounting assembly 116 configured to enable movement of the first outlet roller 112 relative to the second outlet roller 114 and to urge the first outlet roller 112 toward the second belt 40 to reduce the variations in the thickness 108 of the mat 110 of the agricultural product 12. The first mounting assembly 116 is configured to enable movement of the first outlet roller 112 relative to the second outlet roller 114 with respect to an axis extending through the pair of opposing belts 36 and through the mat 110 (e.g., a vertical axis 88 of the agricultural machine system). In the illustrated embodiment, the first mounting assembly 116 includes a first pair of pivot arms 118 pivotally coupled to opposite lateral ends of the first outlet roller 112. The first pair of pivot arms 118 are also pivotally coupled to a frame of the agricultural machine system. Accordingly, the first pair of pivot arms 118 enables the first outlet roller 112 to move toward the second outlet roller 114 and away from the second outlet roller 114 with respect to the axis extending through the pair of opposing belts 36 and through the mat 110 (e.g., the vertical axis 88).

In addition, the first mounting assembly 116 includes a first biasing assembly 120 configured to urge the first outlet roller 112 toward the second belt 40. The first biasing assembly 120 may include any suitable biasing device(s), and, in certain embodiments, the biasing device(s) may be coupled to the first pair of pivot arms 118 and configured to urge the first pair of pivot arms 118 to move the first outlet roller 112 toward the second belt 40. For example, the biasing device(s) may include resilient element(s), spring(s) (e.g., coil spring(s), leaf spring(s), torsion spring(s), etc.) hydraulic cylinder(s), pneumatic cylinder(s), other suitable biasing device(s), or a combination thereof. In embodiments in which the biasing device(s) include hydraulic cylinder(s) and/or pneumatic cylinder(s), the force applied by the cylinder(s) may be adjusted (e.g., manually and/or automatically, prior to operation of the agricultural machine system and/or during operation of the agricultural machine system, etc.). For example, in certain embodiments, movement of the first outlet roller 112 may be selectively disabled (e.g., by significantly increasing the pressure within the cylinder(s)). In certain embodiments, movement of the first outlet roller 112 may be selectively disabled by a movable stop (e.g., latch, etc.). Furthermore, in certain embodiments, the first biasing assembly may be integrated with the first pair of pivot arms. For example, each pivot arm may be fixedly coupled to the frame of the agricultural machine system, and each pivot arm (e.g., formed from spring steel, etc.) may be configured to urge the first outlet roller toward the second belt.

While the first mounting assembly 116 includes the first pair of pivot arms 118 in the illustrated embodiment, in other embodiments, the first mounting assembly may include other suitable component(s) configured to movably couple the first outlet roller to the frame, such as track assemblies, slider assemblies, pin and slot assemblies, etc. Furthermore, in the illustrated embodiment, the first mounting assembly 116 enables movement of the first outlet roller 112 relative to the second outlet roller 114 along a curved path (e.g., having a center point at the pivot points of the first pair of pivot arms 118). However, in other embodiments (e.g., in embodiments in which the first mounting assembly includes track assemblies, slider assemblies, pin and slot assemblies, etc.), the first mounting assembly may enable movement of the first outlet roller relative to the second outlet roller along a straight path (e.g., aligned with the vertical axis 88, angled with respect to the vertical axis 88, etc.) or along another suitable path.

In certain embodiments, the first mounting assembly 116 includes a first inward mechanical stop configured to block movement of the first outlet roller 112 toward the second belt 40. During normal operation, the first biasing assembly 120 may drive the first outlet roller 112 to an operational position in which the first inward mechanical stop blocks movement of the first outlet roller 112 toward the second belt 40. With the first outlet roller 112 in the operational position, the downstream end 86 of the first belt 38 may be maintained in a fixed position, thereby leveling a top surface of the mat 110, which reduces the variations in the thickness 108 of the mat 110. The first inward mechanical stop may include any suitable structure(s)/device(s) configured to block movement of the first outlet roller toward the second belt, such as peg(s) configured to engage the pivot arm(s), the end(s) of slot(s) configured to engage bearing(s)/joint(s) connecting the pivot arm(s) to the first outlet roller, etc. Furthermore, in certain embodiments, the first mounting assembly 116 includes a first outward mechanical stop configured to block movement of the first outlet roller 112 away from the second belt 40. The first outward mechanical stop may include any suitable structure(s)/device(s) configured to block movement of the first outlet roller away from the second belt, such as peg(s) configured to engage the pivot arm(s), the end(s) of slot(s) configured to engage bearing(s)/joint(s) connecting the pivot arm(s) to the first outlet roller, etc. While a first mounting assembly including the first inward mechanical stop and the first outward mechanical stop is disclosed above, in certain embodiments, the first inward mechanical stop and/or the first outward mechanical stop may be omitted.

In the illustrated embodiment, the mat leveling system 106 includes a second mounting assembly 122 (e.g., mounting assembly) configured to enable movement of the second outlet roller 114 relative to the first outlet roller 112 and to urge the second outlet roller 114 toward the first belt 38 to reduce the variations in the thickness 108 of the mat 110 of the agricultural product 12. The second mounting assembly 122 is configured to enable movement of the second outlet roller 114 relative to the first outlet roller 112 with respect to an axis extending through the pair of opposing belts 36 and through the mat 110 (e.g., the vertical axis 88). In the illustrated embodiment, the second mounting assembly 122 includes a second pair of pivot arms 124 (e.g., pair of pivot arms) pivotally coupled to opposite lateral ends of the second outlet roller 114. The second pair of pivot arms 124 are also pivotally coupled to a frame of the agricultural machine system. Accordingly, the second pair of pivot arms 124 enables the second outlet roller 114 to move toward the first outlet roller 112 and away from the first outlet roller 112 with respect to the axis extending through the pair of opposing belts 36 and through the mat 110 (e.g., the vertical axis 88).

In addition, the second mounting assembly 122 includes a second biasing assembly 126 (e.g., biasing assembly) configured to urge the second outlet roller 114 toward the first belt 38. The second biasing assembly 126 may include any suitable biasing device(s), and, in certain embodiments, the biasing device(s) may be coupled to the second pair of pivot arms 124 and configured to urge the second pair of pivot arms 124 to move the second outlet roller 114 toward the first belt 38. For example, the biasing device(s) may include resilient element(s), spring(s) (e.g., coil spring(s), leaf spring(s), torsion spring(s), etc.) hydraulic cylinder(s), pneumatic cylinder(s), other suitable biasing device(s), or a combination thereof. In embodiments in which the biasing device(s) include hydraulic cylinder(s) and/or pneumatic cylinder(s), the force applied by the cylinder(s) may be adjusted (e.g., manually and/or automatically, prior to operation of the agricultural machine system and/or during operation of the agricultural machine system, etc.). For example, in certain embodiments, movement of the second outlet roller 114 may be selectively disabled (e.g., by significantly increasing the pressure within the cylinder(s)). In certain embodiments, movement of the second outlet roller 114 may be selectively disabled by a movable stop (e.g., latch, etc.). Furthermore, in certain embodiments, the second biasing assembly may be integrated with the second pair of pivot arms. For example, each pivot arm may be fixedly coupled to the frame of the agricultural machine system, and each pivot arm (e.g., formed from spring steel, etc.) may be configured to urge the second outlet roller toward the second belt.

While the second mounting assembly 122 includes the second pair of pivot arms 124 in the illustrated embodiment, in other embodiments, the second mounting assembly may include other suitable component(s) configured to movably couple the second outlet roller to the frame, such as track assemblies, slider assemblies, pin and slot assemblies, etc. Furthermore, in the illustrated embodiment, the second mounting assembly 122 enables movement of the second outlet roller 114 relative to the first outlet roller 112 along a curved path (e.g., having a center point at the pivot points of the second pair of pivot arms 124). However, in other embodiments (e.g., in embodiments in which the second mounting assembly includes track assemblies, slider assemblies, pin and slot assemblies, etc.), the second mounting assembly may enable movement of the second outlet roller relative to the first outlet roller along a straight path (e.g., aligned with the vertical axis 88, angled with respect to the vertical axis 88, etc.) or along another suitable path.

In certain embodiments, the second mounting assembly 122 includes a second inward mechanical stop configured to block movement of the second outlet roller 114 toward the first belt 38. During normal operation, the second biasing assembly 126 may drive the second outlet roller 114 to an operational position in which the second inward mechanical stop blocks movement of the second outlet roller 114 toward the first belt 38. With the second outlet roller 114 in the operational position, a portion of the agricultural product engaging surface 78 of the second belt 40 at the second outlet roller 114 may be maintained in a fixed position, thereby leveling a bottom surface of the mat 110, which reduces the variations in the thickness 108 of the mat 110. The second inward mechanical stop may include any suitable structure(s)/device(s) configured to block movement of the second outlet roller toward the first belt, such as peg(s) configured to engage the pivot arm(s), the end(s) of slot(s) configured to engage bearing(s)/joint(s) connecting the pivot arm(s) to the second outlet roller, etc. Furthermore, in certain embodiments, the second mounting assembly 122 includes a second outward mechanical stop configured to block movement of the second outlet roller 114 away from the first belt 38. The second outward mechanical stop may be configured to limit deflection of the second belt 40 at the second outlet roller 114, thereby enhancing the longevity of the second belt. The second outward mechanical stop may include any suitable structure(s)/device(s) configured to block movement of the second outlet roller away from the first belt, such as peg(s) configured to engage the pivot arm(s), the end(s) of slot(s) configured to engage bearing(s)/joint(s) connecting the pivot arm(s) to the second outlet roller, etc. While a second mounting assembly including the second inward mechanical stop and the second outward mechanical stop is disclosed above, in certain embodiments, the second inward mechanical stop and/or the second outward mechanical stop may be omitted.

As previously discussed, the first biasing assembly 120 urges the first outlet roller 112 toward the second belt 40. Accordingly, during normal operation, the portion of the agricultural product engaging surface 72 of the first belt 38 at the first outlet roller 112 is positioned to level the top surface of the mat 110, thereby reducing the variations in the thickness 108 of the mat 110. Furthermore, the second biasing assembly 126 urges the second outlet roller 114 toward the first belt 38. Accordingly, during normal operation, the portion of the agricultural product engaging surface 78 of the second belt 40 at the second outlet roller 114 is positioned to level the bottom surface of the mat 110, thereby reducing the variations in the thickness 108 of the mat 110. For example, the mat leveling system 106 may reduce the variations in the thickness of the mat 110 along the translational direction 74 and/or along the lateral direction crosswise to the translational direction 74. Reducing the variations in the thickness 108 of the mat 110 enhances the uniformity of the agricultural product entering the baler. As a result, density variations within the resultant bale may be reduced, thereby enhancing downstream logistics and processing of the agricultural product.

Furthermore, in response to a high-density clump of material reaching the outlet 44 of the pair of opposing belts 36, the first mounting assembly 116 enables the first outlet roller 112 to move away from the second outlet roller 114, and the second mounting assembly 122 enables the second outlet roller 114 to move away from the first outlet roller 112. For example, movement of the high-density clump through the outlet 44 may drive the first outlet roller 112 to move away from the second outlet roller 114 (e.g., via rotation of the first pair of pivot arms 118 against the force applied by the first biasing assembly 120) and the second outlet roller 114 to move away from the first outlet roller 112 (e.g., via rotation of the second pair of pivot arms 124 against the force applied by the second biasing assembly 126). As a result, the possibility of the high-density clump of material plugging the conveying system 34 is substantially reduced or eliminated.

In the illustrated embodiment, the first mounting assembly 116 enables movement of the first outlet roller 112 relative to the second outlet roller 114 with respect to an axis extending through the pair of opposing belts 36 and through the mat 110 (e.g., the vertical axis 88). In addition, the second mounting assembly 122 enables movement of the second outlet roller 114 relative to the first outlet roller 112 with respect to an axis extending through the pair of opposing belts 36 and through the mat 110 (e.g., the vertical axis 88). In certain embodiments, the remaining rollers of the conveying assembly 34 (e.g., the primary rollers 80 and the secondary rollers 82) may be fixedly and rotatably mounted to the frame of the agricultural machine system (e.g., the position of each remaining roller may be fixed relative to the frame of the agricultural machine system). While both the first outlet roller 112 and the second outlet roller 114 are movably coupled to the frame of the agricultural machine system by a respective mounting assembly in the illustrated embodiment, in other embodiments, only one of the outlet rollers (e.g., the first outlet roller or the second outlet roller) may be movably coupled to the frame by the respective mounting assembly. In such embodiments, the mounting assembly for the other outlet roller may be omitted. For example, in certain embodiments, the first outlet roller may be fixedly and rotatably coupled to the frame of the agricultural machine system, and the second outlet roller may be movably and rotatably coupled to the frame of the agricultural machine system by the second mounting assembly. Furthermore, in certain embodiments, at least one of the other rollers of the conveying system (e.g., not an outlet roller) may be movably coupled to the frame by a respective mounting assembly. In such embodiments, the mounting assembly may enable the respective roller to move relative to a corresponding roller on the opposite side of the mat, and the mounting assembly (e.g., a biasing assembly of the mounting assembly) may urge the roller toward the opposing belt to reduce variations in the thickness of the mat.

As previously discussed, the first outlet roller 112 is positioned at the outlet 44 of the pair of opposing belts 36, and the second outlet roller 114 is positioned at the outlet 44 of the pair of opposing belts 36. Accordingly, the agricultural product 12 passes between the first outlet roller 112 and the second outlet roller 114 at the outlet 44 of the pair of opposing belts 36, thereby reducing variations in the thickness 108 of the mat 110 (e.g., along the translational direction 74 and/or along the lateral direction). While the first outlet roller 112 corresponds to a primary roller 80 and the second outlet roller 114 corresponds to a secondary roller 82 in the illustrated embodiment, in other embodiments (e.g., in embodiments in which the first belt extends beyond the second belt with respect to the translational direction), the first outlet roller may correspond to a secondary roller, and the second outlet roller may correspond to a primary roller. Furthermore, in certain embodiments (e.g., in embodiments in which the downstream ends of the belts may be located at the same position with respect to the translational direction), the first outlet roller and the second outlet roller may correspond to primary rollers. In addition, while each roller of the mat leveling system 106 is positioned at the outlet 44 of the pair of opposing belts 36 in the illustrated embodiment, in other embodiments, at least one roller of the mat leveling system (e.g., which is movable relative to the frame of the agricultural machine system and urged toward the opposing belt) may be positioned at another suitable location with respect to the translational direction (e.g., between the inlet and the outlet of the pair of opposing belts, inclusive of the inlet). For example, in certain embodiments, the mat leveling system may include a roller (e.g., which is movable relative to the frame of the agricultural machine system and urged toward the opposing belt) positioned at the same location with respect to the translational direction as a fixedly mounted primary or secondary roller. Additionally or alternatively, in certain embodiments, the mat leveling system may include a pair of rollers (e.g., each of which is movable relative to the frame of the agricultural machine system and urged toward the opposing belt) positioned at the same location with respect to the translational direction.

As previously discussed, the first mounting assembly 116 includes the first pair of pivot arms 118 pivotally coupled to opposite lateral ends of the first outlet roller 112 and pivotally coupled to the frame of the agricultural machine system. In addition, the second mounting assembly 122 includes the second pair of pivot arms 124 pivotally coupled to opposite lateral ends of the second outlet roller 114 and pivotally coupled to the frame of the agricultural machine system. In certain embodiments, the first pair of pivot arms 118 are fixedly coupled to one another, such that the first pair of pivot arms 118 rotate together, and/or the second pair of pivot arms 124 are fixedly coupled to one another, such that the second pair of pivot arms 124 rotate together. However, in certain embodiments, the first pair of pivot arms 118 may rotate independently of one another relative to the frame of the agricultural machine system. In such embodiments, the first outlet roller 112 may rotate about an axis extending along the translational direction 74 (e.g., due to a high-density clump of material passing through the outlet 44 of the pair of opposing belts 36). Furthermore, in certain embodiments, the second pair of pivot arms 124 may rotate independently of one another relative to the frame of the agricultural machine system. In such embodiments, the second outlet roller 114 may rotate about the axis extending along the translational direction 74 (e.g., due to a high-density clump of material passing through the outlet 44 of the pair of opposing belts 36).

As illustrated, the first belt 38 and the second belt 40 are spaced apart from one another with respect to the vertical axis 88 of the agricultural machine system. In addition, as previously discussed, the pair of opposing belts 36 is configured to transport the agricultural product 12 along the downstream direction 74 toward the cavity of the baler. The starter roller 66 is spaced apart from the first belt 38 by a gap 104 along the vertical axis 88. As previously discussed, the starter roller 66 is configured to initiate formation of the bale of the agricultural product within the cavity. Furthermore, the conveying system 34 includes a blocking bar 128 positioned proximate to the first belt 38 and to the starter roller 66. A vertical extent of the blocking bar 128 at least partially overlaps the gap 104 with respect to the vertical axis 88, and the blocking bar 128 is configured to block the agricultural product within the cavity from passing through the gap along an upstream direction 130. As a result, the amount of agricultural product that engages a top surface of the first belt 38 and is moved toward the accumulator may be substantially reduced, thereby substantially reducing accumulation of the agricultural product within and/or on certain components of the agricultural machine system 10 (e.g., components that are not configured to interact with the agricultural product).

As previously discussed, in certain embodiments, the first outlet roller 112 is movably coupled to the frame of the agricultural machine system by the first mounting assembly 116. Accordingly, the first outlet roller 112 may move relative to the second outlet roller 114 with respect to the vertical axis 88, thereby varying the extent of the gap 104 along the vertical axis 88. Even as the extent of the gap 104 varies (e.g., between a maximum and a minimum established by the mechanical stops), the vertical extent of the blocking bar 128 at least partially overlaps the gap 104 with respect to the vertical axis 88.

Figure 4:
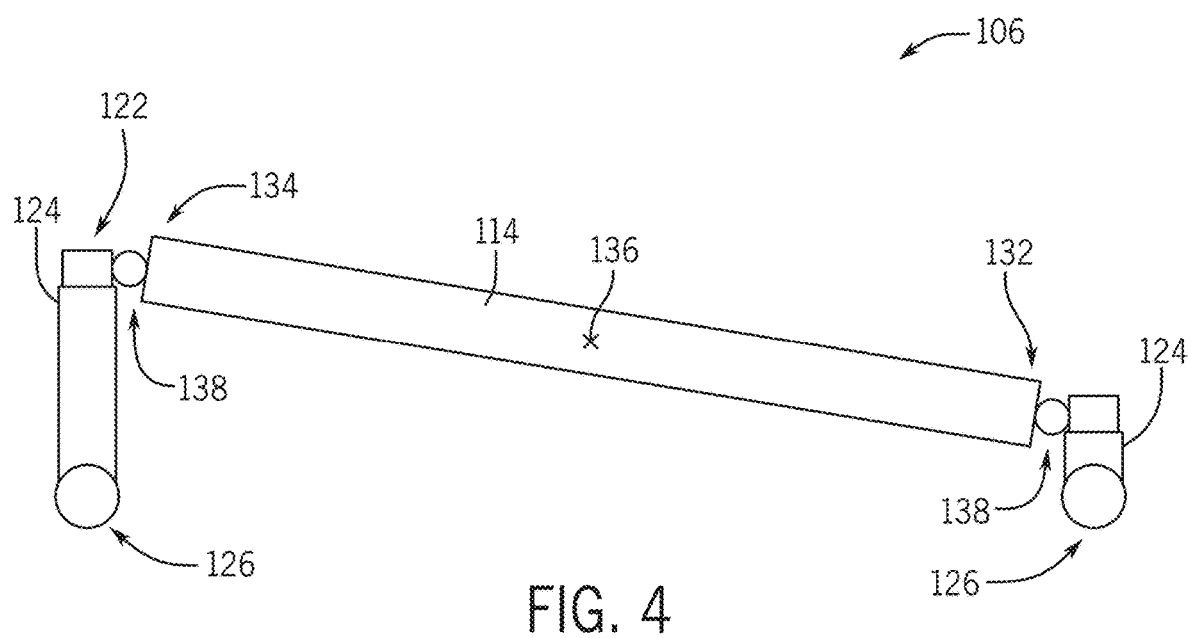
FIG. 4 is a schematic view of a portion of an embodiment of a mat leveling system that may be employed within the conveying system of FIG. 3.

FIG. 4 is a schematic view of a portion of an embodiment of a mat leveling system 106 that may be employed within the conveying system of FIG. 3. As previously discussed, the second mounting assembly 122 includes the second pair of pivot arms 124 pivotally coupled to opposite lateral ends of the second outlet roller 114 and pivotally coupled to the frame of the agricultural machine system. As illustrated, one pivot arm 124 is pivotally coupled to a first lateral end 132 of the second outlet roller 114, and the other pivot arm 124 is pivotally coupled to a second lateral end 134 of the second outlet roller 114. In the illustrated embodiment, the second pair of pivot arms 124 may rotate independently of one another relative to the frame of the agricultural machine system. Accordingly, the second outlet roller 114 may rotate about an axis 136 extending along the translational direction (e.g., due to a high-density clump of material passing through the outlet of the pair of opposing belts).

The second outlet roller 114 may be pivotally coupled to each pivot arm 124 by any suitable type of connection 138 that facilitates rotation of the second outlet roller 114 about the axis 136. For example, in certain embodiments, each connection 138 may include a universal joint, a spherical bearing, a flexible shaft, or another suitable type of connection. While the second pair of pivot arms 124 are configured to rotate independently of one another in the illustrated embodiment, in other embodiments, the second pair of pivot arms may be fixedly coupled to one another, such that the pivot arms rotate together. In such embodiments, each connection between the second outlet roller and the respective pivot arm may include a ball bearing assembly, a bushing assembly, etc. (e.g., which may be less complex and expensive than a connection configured to enable the second outlet roller to pivot about the axis extending along the translational direction). Furthermore, in certain embodiments, the conveying system may include multiple second outlet rollers distributed along the lateral direction (e.g., in which each second outlet roller is movably coupled to the frame of the agricultural machine system by a respective pair of pivot arms). While the second mounting assembly 122 is disclosed above, in embodiments in which the first outlet roller is movably and rotatably coupled to the frame of the agricultural machine system by the first mounting assembly, the first mounting assembly may have any of the structure(s) and/or variation(s) disclosed above to movably couple the first outlet roller to the frame of the agricultural machine system.

Figure 5A:
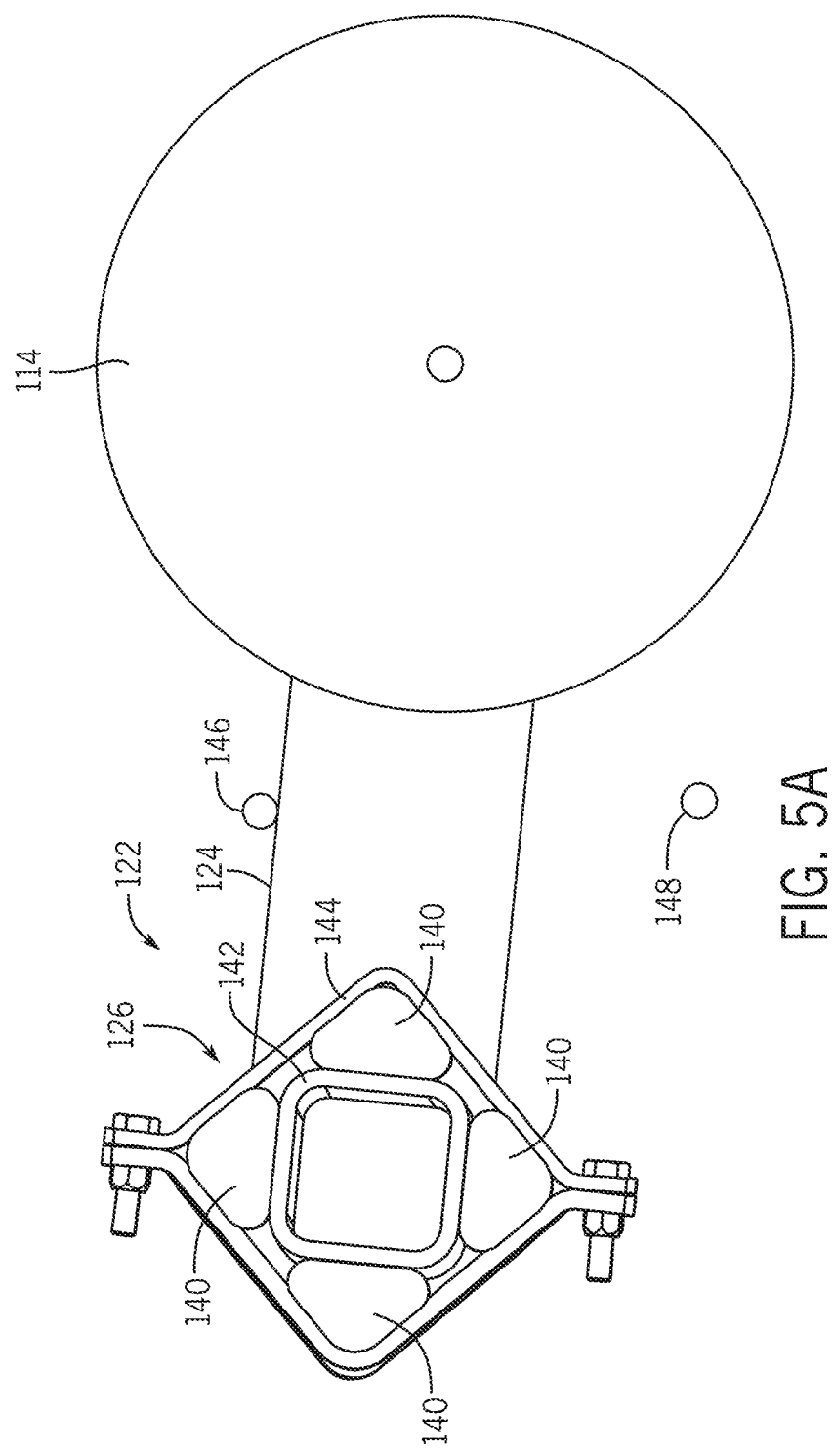
FIG. 5A is a schematic view of an embodiment of a mounting assembly that may be employed within the mat leveling system.

FIG. 5A is a schematic view of an embodiment of a mounting assembly (e.g., second mounting assembly 122) that may be employed within the mat leveling system. In the illustrated embodiment, the second biasing assembly 126 includes resilient elements 140 disposed between a support 142 of the frame of the agricultural machine system and a mount 144 of a pivot arm 124 of the second pair of pivot arms 124. The mount 144 of the pivot arm 124 is configured to rotate about the support 142, thereby enabling movement of the second outlet roller 114 relative to the first outlet roller. Furthermore, the resilient elements 140 of the second biasing assembly 126 are configured to urge the pivot arm 124 to rotate toward the first belt, thereby urging the second outlet roller 114 toward the first belt. In the illustrated embodiment, the second biasing assembly 126 includes four resilient elements 140. However, in other embodiments, the second biasing assembly 126 may include more or fewer resilient elements (e.g., 1, 2, 3, 5, 6, or more). Furthermore, in certain embodiments, the second biasing assembly may include other/additional suitable biasing device(s) configured to urge the second outlet roller toward the first belt. In certain embodiments, the second biasing assembly may also include resilient element(s) disposed between a support of the frame of the agricultural machine system and a mount of the other pivot arm of the second pair of pivot arms. In addition, while pivot arm(s) pivotally coupled to support(s) of the frame of the agricultural machine system via mount(s) are disclosed above, in other embodiments, at least one pivot arm may be pivotally coupled to the frame of the agricultural machine system by other suitable connection element(s).

In the illustrated embodiment, the second mounting assembly 122 includes a second inward mechanical stop 146 configured to block movement of the second outlet roller 114 toward the first belt. During normal operation, the second biasing assembly 126 may drive the second outlet roller 114 to the illustrated operational position in which the second inward mechanical stop 146 blocks movement of the second outlet roller 114 toward the first belt. With the second outlet roller 114 in the operational position, the downstream end of the second belt may be maintained in a fixed position, thereby leveling the top surface of the mat, which reduces the variations in the thickness of the mat. In the illustrated embodiment, the second inward mechanical stop 146 includes pegs configured to engage the respective pivot arms 124. However, in other embodiments, the second inward mechanical stop may include any other suitable structure(s)/device(s) configured to block movement of the second outlet roller toward the first belt, such as the end(s) of slot(s) configured to engage bearing(s)/joint(s) connecting the pivot arm(s) to the second outlet roller, etc. Furthermore, in certain embodiments, the second inward mechanical stop may be integrated with the support and/or the mount. For example, movement of the second outlet roller toward the first belt may be blocked by contact between the mount and the support as the mount rotates about the support (e.g., due to the shape/configuration of the mount and the support).

In the illustrated embodiment, the second mounting assembly 122 includes a second outward mechanical stop 148 configured to block movement of the second outlet roller 114 away from the first belt. In the illustrated embodiment, the second outward mechanical stop 148 includes pegs configured to engage the respective pivot arms 124. However, in other embodiments, the second outward mechanical stop may include any suitable structure(s)/device(s) configured to block movement of the second outlet roller away from the first belt, such as the end(s) of slot(s) configured to engage bearing(s)/joint(s) connecting the pivot arm(s) to the second outlet roller, etc. Furthermore, in certain embodiments, the second outward mechanical stop may be integrated with the support and/or the mount. For example, movement of the second outlet roller away from the first belt may be blocked by contact between the mount and the support as the mount rotates about the support (e.g., due to the shape/configuration of the mount and the support). While the second mounting assembly 122 includes the second inward mechanical stop 146 and the second outward mechanical stop 148 in the illustrated embodiment, in certain embodiments, the second inward mechanical stop and/or the second outward mechanical stop may be omitted. In addition, while the second mounting assembly 122 is disclosed above, in embodiments in which the first outlet roller is movably and rotatably coupled to the frame of the agricultural machine system by the first mounting assembly, the first mounting assembly may have any of the structure(s) and/or variation(s) disclosed above (e.g., with regard to the biasing assembly, the inward mechanical stop, the outward mechanical stop, etc.) to movably couple the first outlet roller to the frame of the agricultural machine system.

Figure 5B:
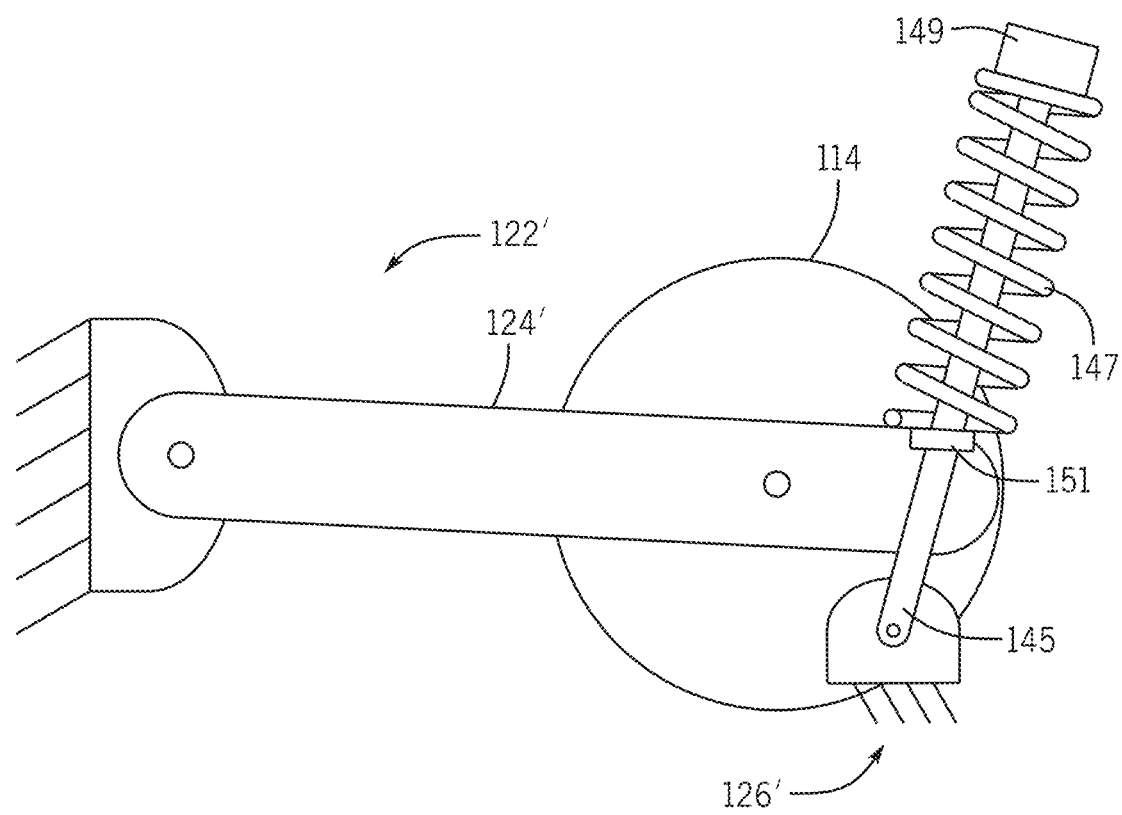
FIG. 5B is a schematic view of another embodiment of a mounting assembly that may be employed within the mat leveling system.

FIG. 5B is a schematic view of another embodiment of a mounting assembly (e.g., second mounting assembly 122') that may be employed within the mat leveling system. In the illustrated embodiment, each pivot arm 124' of the second pair of pivot arms 124' is pivotally coupled to the frame of the agricultural machine system, thereby enabling movement of the second outlet roller 114 relative to the first outlet roller. Furthermore, in the illustrated embodiment, the second biasing assembly 126' includes a shaft 145 and a spring 147 disposed about the shaft 145. In the illustrated embodiment, the spring 147 is positioned between a fastener 149 coupled to the shaft 145 and a plate 151 coupled to the pivot arm 124'. The spring 147 is configured to urge the pivot arm 124' to rotate toward the first belt, thereby urging the second outlet roller 114 toward the first belt. In the illustrated embodiment, the second biasing assembly 126' includes a single spring 147. However, in other embodiments, the second biasing assembly may include more springs (e.g., 2, 3, 4, or more). Furthermore, while the spring 147 is disposed about the shaft 145 in the illustrated embodiment, in other embodiments, the shaft may be omitted, and the spring may be coupled to the pivot arm and to the frame of the agricultural machine system. In certain embodiments, the second biasing assembly may also include spring(s) configured to urge the other pivot arm of the second pair of pivot arms to rotate toward the first belt. In addition, in certain embodiments, the second mounting assembly 122' may include the second inward mechanical stop and/or the second outward mechanical stop disclosed above with reference to FIG. 5A. While the second mounting assembly 122' is disclosed above, in embodiments in which the first outlet roller is movably and rotatably coupled to the frame of the agricultural machine system by the first mounting assembly, the first mounting assembly may have any of the structure(s) and/or variation(s) disclosed above (e.g., with regard to the biasing assembly, etc.) to movably couple the first outlet roller to the frame of the agricultural machine system.

Figure 6:
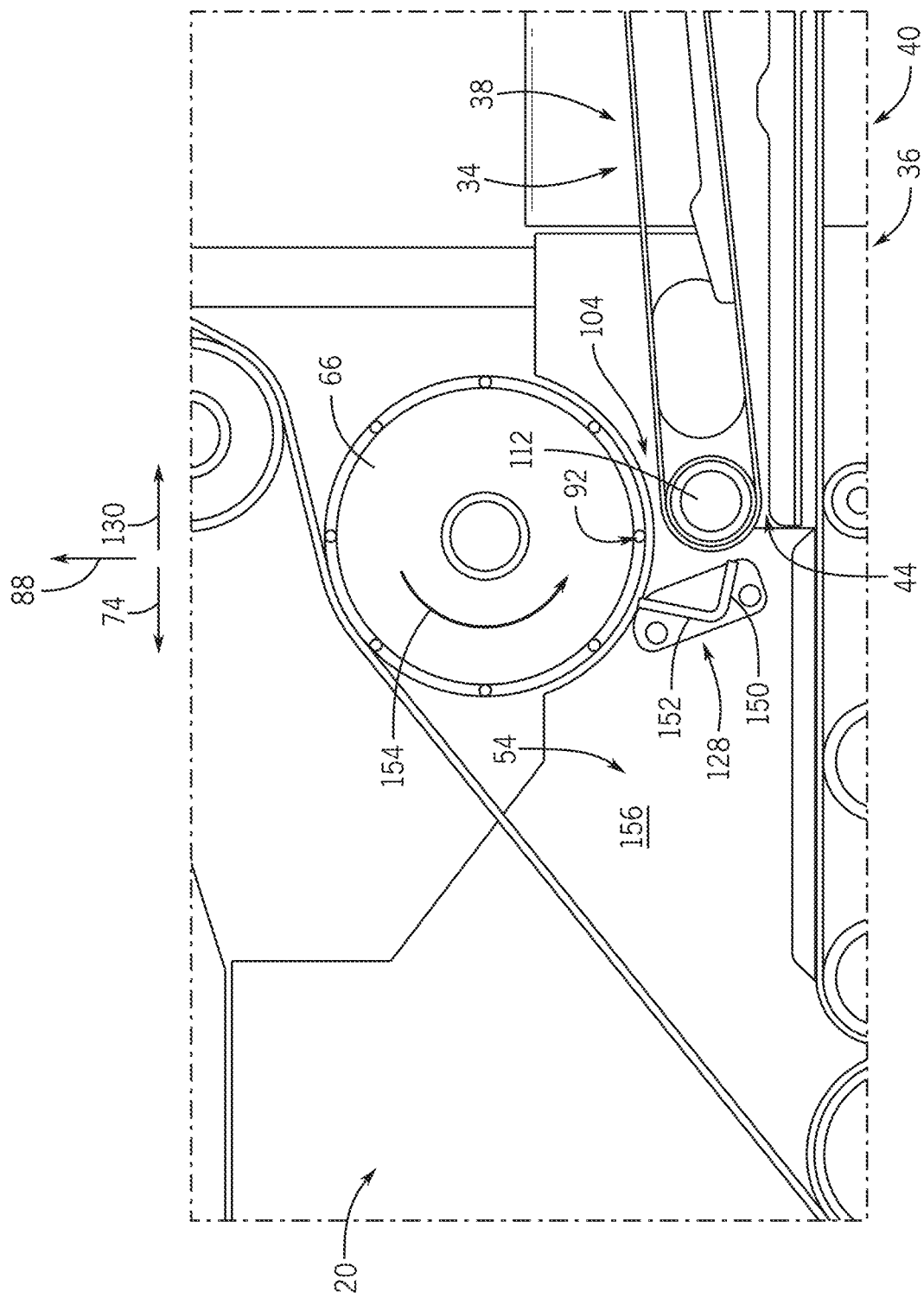
FIG. 6 is a schematic view of an embodiment of a blocking bar that may be employed within the conveying system of FIG. 3.

FIG. 6 is a schematic view of an embodiment of the blocking bar 128 that may be employed within the conveying system 34 of FIG. 3. As previously discussed, the second belt 40 is spaced apart from the first belt 38 with respect to the vertical axis 88, and the first and second belts are configured to transport the agricultural product along the downstream direction 74 to the cavity 54 of the baler. Furthermore, the starter roller 66 is spaced apart from the first belt 38 by the gap 104 along the vertical axis 88. As used herein with regard to the vertical separation between the first belt 38 and the starter roller 66, "gap" refers to the minimum vertical distance between the first belt 38 and the starter roller 66. In the illustrated embodiment, the first outlet roller 112 is fixedly and rotatably coupled to the frame of the agricultural machine system. However, in embodiments in which the first outlet roller is movably coupled to the frame of the agricultural machine system by the first mounting assembly, the first outlet roller may move relative to the second outlet roller with respect to the vertical axis 88, thereby varying the extent of the gap 104 along the vertical axis 88. In such embodiments, "gap" refers to the current or instantaneous minimum vertical distance between the first belt and the starter roller. As previously discussed, the starter roller 66 is configured to initiate formation of the bale of the agricultural product within the cavity 54 of the baler 20.

Furthermore, the blocking bar 128 is positioned proximate to the first belt 38 and to the starter roller 66. As used herein with regard to a first spacing between the blocking bar 128 and the first belt 38, and a second spacing between the blocking bar 128 and the starter roller 66, "proximate" refers to a spacing that is less than a threshold distance, thereby substantially blocking agricultural product from flowing between the blocking bar 128 and the first belt 38, and between the blocking bar 128 and the starter roller 66. For example, the threshold distance may be 5 cm, 4 cm, 3 cm, 2 cm, 1 cm, 0.5 cm, or 0.25 cm. In addition, the first spacing between the blocking bar 128 and the first belt 38, and the second spacing between the blocking bar 128 and the starter roller 66 may be selected to substantially reduce or eliminate the possibility of contact between the starter roller 66 and the blocking bar 128, and between the first belt 38 and the blocking bar 128 during operation of the agricultural machine system.

In addition, the vertical extent of the blocking bar 128 (e.g., extent of the blocking bar along the vertical axis 88) at least partially overlaps the gap 104 with respect to the vertical axis 88. In the illustrated embodiment, the blocking bar 128 entirely overlaps the gap 104 with respect to the vertical axis 88. However, in other embodiments, the blocking bar may only partially overlap the gap with respect to the vertical axis. For example, in certain embodiments, the gap may extend vertically above the blocking bar, or the gap may extend vertically below the blocking bar. As previously discussed, the blocking bar 128 is configured to block the agricultural product within the cavity 54 from passing through the gap 104 along the upstream direction 130. As a result, the amount of agricultural product that engages the top surface of the first belt and is moved toward the accumulator may be substantially reduced, thereby substantially reducing accumulation of the agricultural product within and/or on certain components of the agricultural machine system 10 (e.g., components that are not configured to interact with the agricultural product).

In the illustrated embodiment, an entirety of the blocking bar 128 is positioned downstream from the first belt 38 (e.g., with respect to the downstream direction 74). Furthermore, in the illustrated embodiment, the blocking bar 128 has a first portion 150 and a second portion 152. The first portion 150 is configured to engage the agricultural product downstream from the first belt 38 (e.g., with respect to the downstream direction 74). In addition, the second portion 152 extends from the first portion 150 toward the starter roller 66. The first portion 150 is configured to block the agricultural product from engaging the starter roller 66 before the agricultural product moves into the cavity 54. As a result, the amount of agricultural product that forms the bale may increase, and the amount of agricultural product that moves in the upstream direction 130 through the gap 104 due to rotation of the starter roller 66 in a starter roller rotational direction 154 may decrease. In the illustrated embodiment, the first portion 150 is angled upwardly along the downstream direction 74. Accordingly, the first portion 150 enables the agricultural product to expand as the agricultural product exits through the outlet 44 of the pair of opposing belts 36 along the downstream direction 74. In addition, the first portion 150 is oriented at an obtuse angle relative to an adjacent tangent of the first belt 38 with respect to the first rotational direction of the first belt. Accordingly, the first portion 150 may strip the agricultural product from the first belt and direct the agricultural product away from the first belt. Furthermore, the second portion 152 is oriented at an obtuse angle relative to an adjacent tangent of the starter roller 66 with respect to the starter roller rotational direction 154. Accordingly, the second portion 152 may strip the agricultural product from the starter roller 66 and direct the agricultural product away from the starter roller, thereby enhancing the effectiveness of the starter roller 66 and increasing the agricultural product available for bale formation.

While the first portion 150 of the blocking bar 128 is angled upwardly along the downstream direction 74 in the illustrated embodiment, in other embodiments, the first portion may not be angled (e.g., the first portion may be perpendicular to the vertical axis 88). Furthermore, while the second portion 152 of the blocking bar 128 extends from the first portion 150 of the blocking bar 128 toward the starter roller 66 in the illustrated embodiment, in other embodiments, the second portion may extend in another suitable direction. In addition, while each portion of the blocking bar is straight in the illustrated embodiment, in other embodiments, at least one portion of the blocking bar may be curved or have another suitable shape. While the blocking bar 128 includes two portions in the illustrated embodiment, in other embodiments, the blocking bar may include more or fewer portions (e.g., 1, 3, 4, 5, 6, or more).

In the illustrated embodiment, the blocking bar 128 is coupled to the frame 156 of the agricultural machine system by a fastener connection. However, in other embodiments, the blocking bar may be coupled to the frame of the agricultural machine system by other suitable type(s) of connection(s) (e.g., alone or in combination with the fastener connection), such as a welded connection, an adhesive connection, a press-fit connection, other suitable type(s) of connection(s), or a combination thereof. Furthermore, while the blocking bar 128 is coupled to the frame 156 of the agricultural machine system in the illustrated embodiment, in other embodiments, the blocking bar may be coupled to any other suitable component(s) of the agricultural machine system (e.g., alone or in combination with the frame of the baler).

Figure 7:
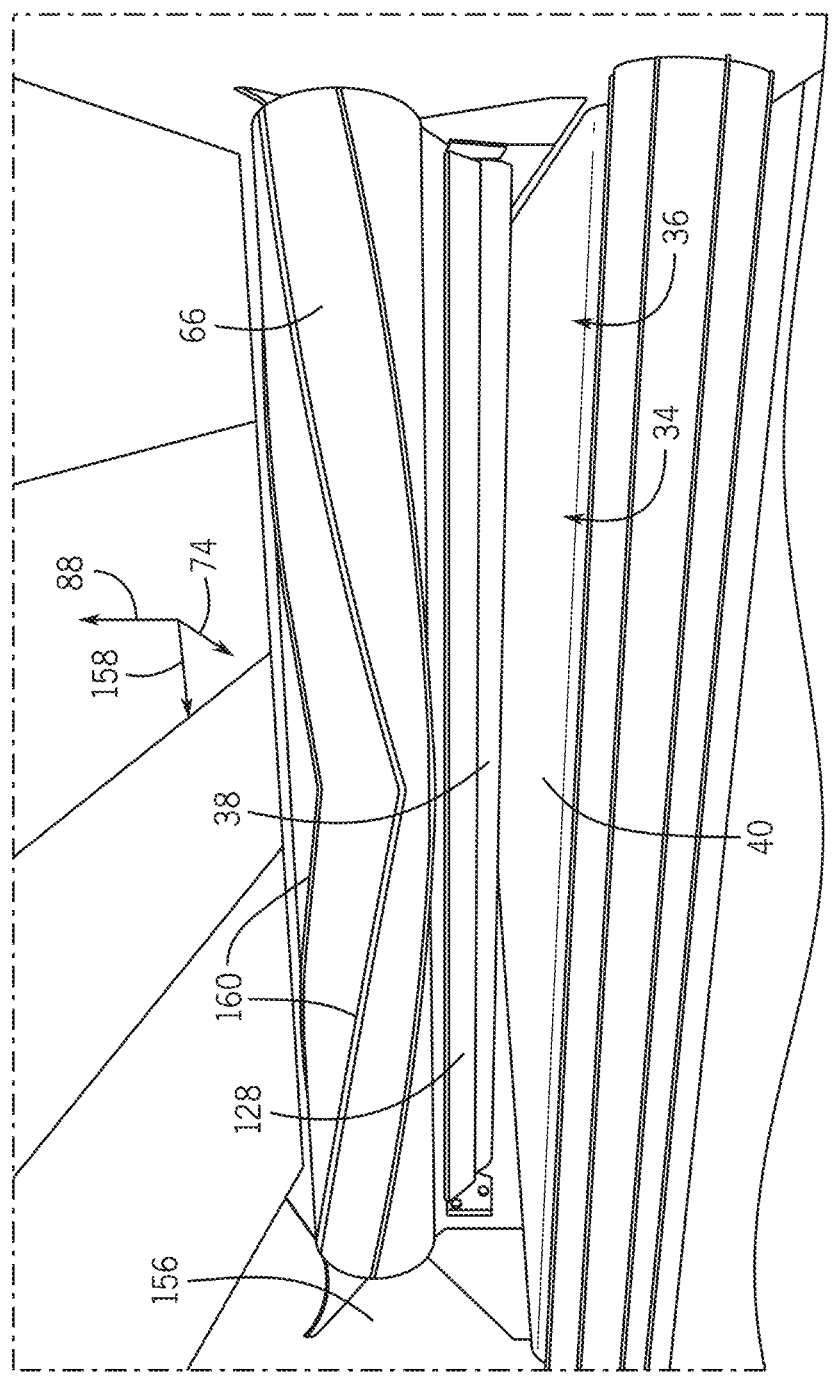
FIG. 7 is a perspective view of the blocking bar of FIG. 6.

FIG. 7 is a perspective view of the blocking bar 128 of FIG. 6. In the illustrated embodiment, the blocking bar 128 extends across an entire lateral extent of the gap (e.g., entire extent of the gap along a lateral axis 158 of the agricultural machine system). In addition, in the illustrated embodiment, the blocking bar 128 is coupled to opposite lateral sides of the frame 156. However, in other embodiments, the blocking bar may be coupled to a single lateral side of the frame, the blocking bar may be coupled to another suitable portion of the frame, the blocking bar may be coupled to another suitable structure of the agricultural machine system, or a combination thereof. Furthermore, while the blocking bar 128 extends across the entire lateral extent of the gap in the illustrated embodiment, in other embodiments, the blocking bar may extend along a portion of the lateral extent of the gap. For example, in certain embodiments, the conveying system may include multiple blocking bars, and each blocking bar may extend along a portion of the lateral extent of the gap. In addition, in certain embodiments, the conveying system may include multiple blocking bars, in which at least two blocking bars overlap with respect to the lateral axis of the agricultural machine system.

In the illustrated embodiment, the starter roller 66 includes multiple flutes 160 extending laterally along the starter roller 66 (e.g., with respect to the lateral axis 158). The flutes 160 are configured to engage the agricultural product as the starter roller rotates, thereby initiating formation of the bale within the cavity of the baler. In the illustrated embodiment, each flute 160 has a chevron shape. The chevron shape of each flute 160 may enhance the ability of the blocking bar 128 to strip the agricultural product from the starter roller 66 as the starter roller 66 rotates. While each flute 160 has a chevron shape in the illustrated embodiment, in other embodiments, at least one flute may have another suitable shape (e.g., straight, wavy, etc.). For example, in certain embodiments, each flute of the starter roller may be straight and extend along a rotational axis of the starter roller. Furthermore, in certain embodiments, the starter roller may not include flutes (e.g., the starter roller may be smooth, the starter roller may include protrusions, the starter roller may include heavy texturing, etc.).

In certain embodiments, the conveying system 34 includes the mat leveling system and the blocking bar disclosed above. However, in other embodiments, the conveying system may not include the mat leveling system, and/or the conveying system may not include the blocking bar. For example, in certain embodiments, the conveying system may include the blocking bar, but not the mat leveling system. In addition, in certain embodiments, the conveying system may include the mat leveling system, but not the blocking bar.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A conveying system for an agricultural harvester, comprising:
 a first belt;
 a second belt spaced apart from the first belt with respect to a vertical axis of the agricultural harvester, wherein the first belt is positioned above the second belt, and the first belt and the second belt are configured to transport agricultural product along a downstream direction toward a cavity;
 a starter roller overlapping the first belt along a longitudinal axis of the conveying system, wherein the starter roller is spaced apart from the first belt by a gap along the vertical axis, and the starter roller is configured to initiate formation of a bale of the agricultural product within the cavity; and
 a blocking bar positioned proximate to the first belt and to the starter roller, wherein a vertical extent of the blocking bar at least partially overlaps the gap with respect to the vertical axis, and the blocking bar is configured to block the agricultural product within the cavity from passing through the gap along an upstream direction.

2. The conveying system of claim 1, wherein the starter roller comprises a plurality of flutes extending laterally along the starter roller.

3. The conveying system of claim 2, wherein each flute of the plurality of flutes has a chevron shape.

4. The conveying system of claim 1, wherein an entirety of the blocking bar is positioned downstream from the first belt.

5. The conveying system of claim 1, wherein the blocking bar has a first portion configured to engage the agricultural product downstream from the first belt.

6. The conveying system of claim 5, wherein the first portion is angled upwardly along the downstream direction.

7. The conveying system of claim 1, wherein a spacing between the blocking bar and the first belt is less than 2 cm.

8. The conveying system of claim 5, wherein the blocking bar has a second portion extending from the first portion toward the starter roller.

9. The conveying system of claim 1, wherein a spacing between the blocking bar and the starter roller is less than 2 cm.

10. The conveying system of claim 1, wherein the starter roller is positioned above the first belt at the gap.

11. A conveying system for an agricultural harvester, comprising:
 a first belt;
 a second belt spaced apart from the first belt with respect to a vertical axis of the agricultural harvester, wherein the first belt and the second belt are configured to transport agricultural product along a downstream direction toward a cavity;
 a starter roller spaced apart from the first belt by a gap along the vertical axis, wherein the starter roller is configured to initiate formation of a bale of the agricultural product within the cavity; and
 a blocking bar positioned proximate to the first belt and to the starter roller, wherein a vertical extent of the blocking bar at least partially overlaps the gap with respect to the vertical axis, and the blocking bar is configured to block the agricultural product within the cavity from passing through the gap along an upstream direction;
 wherein the blocking bar has a first portion and a second portion, the first portion is configured to engage the agricultural product downstream from the first belt, the second portion extends from the first portion to a distal end of the blocking bar in a direction toward the starter roller, a minimum distance between the blocking bar and the starter roller is located at the distal end of the blocking bar, and the second portion is oriented at an obtuse angle relative to an adjacent tangent of the starter roller with respect to a starter roller rotational direction to strip the agricultural product from the starter roller.

12. The conveying system of claim 11, wherein the starter roller comprises a plurality of flutes extending laterally along the starter roller.

13. The conveying system of claim 11, wherein an entirety of the blocking bar is positioned downstream from the first belt.

14. The conveying system of claim 11, wherein the first portion is angled upwardly along the downstream direction.

15. The conveying system of claim 11, wherein the minimum distance between the blocking bar and the starter roller is less than 2 cm.

16. A conveying system for an agricultural harvester, comprising:
 a first belt;
 a second belt spaced apart from the first belt with respect to a vertical axis of the agricultural harvester, wherein the first belt is positioned above the second belt, and the first belt and the second belt are configured to transport agricultural product along a downstream direction toward a cavity;
 a starter roller overlapping the first belt along a longitudinal axis of the conveying system, wherein the starter roller is spaced apart from the first belt by a gap along the vertical axis, and the starter roller is configured to initiate formation of a bale of the agricultural product within the cavity; and
 a blocking bar positioned proximate to the first belt and to the starter roller, wherein a vertical extent of the blocking bar at least partially overlaps the gap with respect to the vertical axis, and the blocking bar is configured to block the agricultural product within the cavity from passing through the gap along an upstream direction;
 wherein the blocking bar has a first portion and a second portion, the first portion is configured to engage the agricultural product downstream from the first belt, the second portion extends from the first portion to a distal end of the blocking bar in a direction toward the starter roller, a minimum distance between the blocking bar and the starter roller is located at the distal end of the blocking bar, and the second portion is oriented at an obtuse angle relative to an adjacent tangent of the starter roller with respect to a starter roller rotational direction to strip the agricultural product from the starter roller.

17. The conveying system of claim 16, wherein the starter roller comprises a plurality of flutes extending laterally along the starter roller.

18. The conveying system of claim 16, wherein the first portion is angled upwardly along the downstream direction.

19. The conveying system of claim 16, wherein a spacing between the blocking bar and the first belt is less than 2 cm.

20. The conveying system of claim 16, wherein the minimum distance between the blocking bar and the starter roller is less than 2 cm.

* * * * *